Patented Dec. 24, 1940

2,226,129

UNITED STATES PATENT OFFICE 2,226,129

SOLVENT FRACTIONATION OF OLEORESINOUS GUM

Arthur W. Hixson, Leonia, N. J., and Ralph Miller, New York, N. Y., assignors to The Chemical Foundation, Incorporated, a corporation of Delaware No Drawing. Application March 21, 1939, Serial No. 263,191

10 Claims. (Cl. 260—107)

This invention is concerned with the fractionation of the exudation of live pine trees when they are tapped.

When pine trees are tapped an oleoresinous material composed principally of rosin, turpentine and water flows from the trees. The prevalent method of treating the gum is to subject it to a steam distillation, causing the turpentine to distill off and leaving the rosin behind. This method of treatment has many disadvantages.

It is an object of this invention to produce rosin which is lighter in color than that achieved by former fractionation methods.

It is an additional object of this invention to produce rosin containing fewer foreign particles than that produced by former fractionation methods.

It is a further object of this invention to produce a multiplicity of rosin fractions.

We have found that the above advantages, and further advantages which will be noted below, are secured when liquefied normally gaseous hydrocarbons are employed to refine and fractionate oleoresinous gum. The first step in our unique process is to dissolve the oleoresinous gum contaminated with dust, dirt, twigs, sugars, water, and other impurities, in liquefied normally gaseous hydrocarbons under pressure. Normally gaseous hydrocarbons may be defined as hydrocarbons having a molecular weight not greater than 72. Propane is the preferred solvent, although mixtures or pure hydrocarbons falling within the above definition are operative. When a solution of propane and the crude gum is formed at room temperature, it is found that all the impurities with the exception of the water settle very readily. This rapid settling takes place because these solvents enjoy properties not possessed by other solvents, for these liquefied hydrocarbons have a very low specific gravity and are extremely fluid. In addition, they do not dissolve complex bodies such as sugars. The settled impurities are separated from the hydrocarbon solution by filtration, centrifuges or decantation. This operation is an important step in the present invention. It is obvious that a wide latitude in the ratio of the volume of gum to the volume of hydrocarbon can be employed in this step. It is preferable to have from 6 to 12 volumes of hydrocarbon to one of gum.

The clear solution of gum in propane is then warmed under pressure. It has been found that by warming the solution under pressure, the rosin precipitates. By varying the ratio of hydrocarbon to gum, the temperature at which rosin begins to come out of solution may be varied. When the ratio of propane to gum is 7 to 1 and the quantity of turpentine present is not more than one-third the quantity of rosin present, rosin will have precipitated before the temperature has reached 150° F. With a ratio of propane to gum between 6 and 12 to 1, substantially all the rosin will have precipitated when a temperature of 190° F. has been reached.

To obtain a multiplicity of rosin fractions it is only necessary to warm the hydrocarbon solution to the temperature at which rosin begins to form a separate phase. The rosin phase is separated from the hydrocarbon phase. This produces the first rosin fraction. The hydrocarbon solution is warmed to a slightly higher temperature. This causes an additional fraction of rosin to separate. This process may be repeated as many times as is desired. In this wise, the rosin is separated into a multiplicity of fractions.

Although the principal constituents of oleoresinous gum are rosin and turpentine, there is always present a small amount of tar, probably formed by the oxidation and polymerization of the rosin acids and turpentine. This tar can be separated from the principal portion of the rosin because it separates from the hydrocarbon solution with the first rosin fraction.

Previous methods of separating and refining the oleoresinous gum from pine trees into its constituents always took advantage of the volatility of the turpentine. The process constituting this invention permits the turpentine to be separated from the rosin by precipitating the rosin. Prior methods achieved the production of high quality turpentine but the rosin necessarily must be of poor quality. The minute particles of dirt which contaminate the gum are not volatile and therefore remain behind disseminated in the mass of the rosin. The sugars react with the various reactive materials present in the secretions of a growing plant under the conditions present in the still. The product of these reactions discolors the rosin. Rosin is extremely sensitive to metals and under the conditions existing in the still such as high temperatures, rosin acids, water, and the metal forming the still, the rosin is discolored. Twigs and other foreign bodies that contaminate the gum contain various colored substances which are extracted by steam. These colored substances add an additional cause for rosin discoloration. It is obvious that the method of fractionating oleoresinous gum now in use provides a plethora of ways by which the quality of the rosin is depreciated. The process described herein suffers none of these disadvantages.

The equipment employed for the distillation of the volatile constituents of the gum is subjected to a variety of corrosive materials. This causes equipment costs to be high in both first and replacement costs. The equipment necessary to carry out the unique process described herein may necessitate a large initial investment but it is subjected to such mild conditions that its rate of deterioration is extremely slow.

After the rosin has been separated from the hydrocarbon solution, the low molecular weight hydrocarbons are separated from the turpentine by a fractional distillation. The low molecular weight hydrocarbons are so much more volatile than the turpentine that the separation is simple and complete. The difference between former methods and the novel process disclosed herein is particularly marked at this stage of the process. The volatility of the turpentine is not employed to segregate it from the other constituents of the gum.

If it is desired, the turpentine may be fractionally distilled to achieve a narrow boiling range fraction but this step does not comprise any part of the present invention.

Having thus described our novel process and outlined its advantages, we claim:

1. The process of solvent fractionation of oleoresinous gums comprising dissolving crude oleoresinous gum in liquefied, normally gaseous hydrocarbons; separating the hydrocarbon solution from any insoluble material; warming the hydrocarbon solution under pressure to create a rosin phase, and separating the rosin phase from the hydrocarbon phase.

2. The process of solvent fractionation of oleoresinous gums comprising dissolving crude oleoresinous gum in liquid propane; permitting the propane solution to remain in a quiescent state until all the solid particles have settled; separating the propane solution from the solid particles; subsequently warming the liquid propane under pressure until a rosin phase appears, and separating the rosin phase from the propane phase.

3. The process of solvent fractionation of oleoresinous gums comprising dissolving the crude oleoresinous gum in liquefied, normally gaseous hydrocarbons; warming the hydrocarbon solution under pressure until a rosin phase appears, and separating the rosin phase from the hydrocarbon phase.

4. The process of producing a plurality of rosin fractions of oleoresinous gums comprising dissolving a crude oleoresinous gum in liquefied, normally gaseous hydrocarbons; warming the hydrocarbon solution under pressure until a rosin phase appears; separating the rosin phase from the hydrocarbon phase; warming the hydrocarbon phase to a higher temperature to produce the formation of a second rosin phase; separating the second rosin phase from the hydrocarbon phase and repeating the cycle until substantially all rosin has been separated from the hydrocarbon solution.

5. The process of solvent refining of the rosin-containing fractions of an oleoresinous gum comprising warming a solution containing such rosin fractions in liquid propane under pressure until a rosin phase separates from the propane phase; separating the rosin phase from the propane phase; warming the propane solution to a high temperature to produce a second rosin phase; separating the second rosin phase from the propane solution and repeating the cycle until substantially all the rosin has been separated from the propane.

6. The process of refining and fractionating oleoresinous gum comprising dissolving the gum in liquefied, normally gaseous, hydrocarbons; permitting the solution to remain quiescent to enable any solid particles present to settle; separating the solid particles from the hydrocarbon solution; warming the hydrocarbon solution under pressure until substantially all the rosin has separated from the hydrocarbon phase; separating the rosin from the hydrocarbon phase, and distilling the hydrocarbon phase to separate the normally gaseous hydrocarbons from the turpentine present.

7. In the process set forth in claim 6, the step comprising dissolving the gum in a liquefied, normally gaseous hydrocarbon having a molecular weight not greater than 72.

8. In the process set forth in claim 6, the step comprising dissolving the gum in liquefied, normally gaseous propane.

9. In the process set forth in claim 6, the step comprising dissolving the gum in a mixture of liquefied, normally gaseous hydrocarbons.

10. In a process of refining an oleoresinous gum, the steps of removing tar therefrom comprising dissolving the gum in a liquefied, normally gaseous hydrocarbon and warming the resultant solution under pressure until a two-phase system forms consisting of an upper hydrocarbon phase and a lower rosin phase, the latter containing substantially all the tar originally present.

ARTHUR W. HIXSON.
RALPH MILLER.